Figure 1:
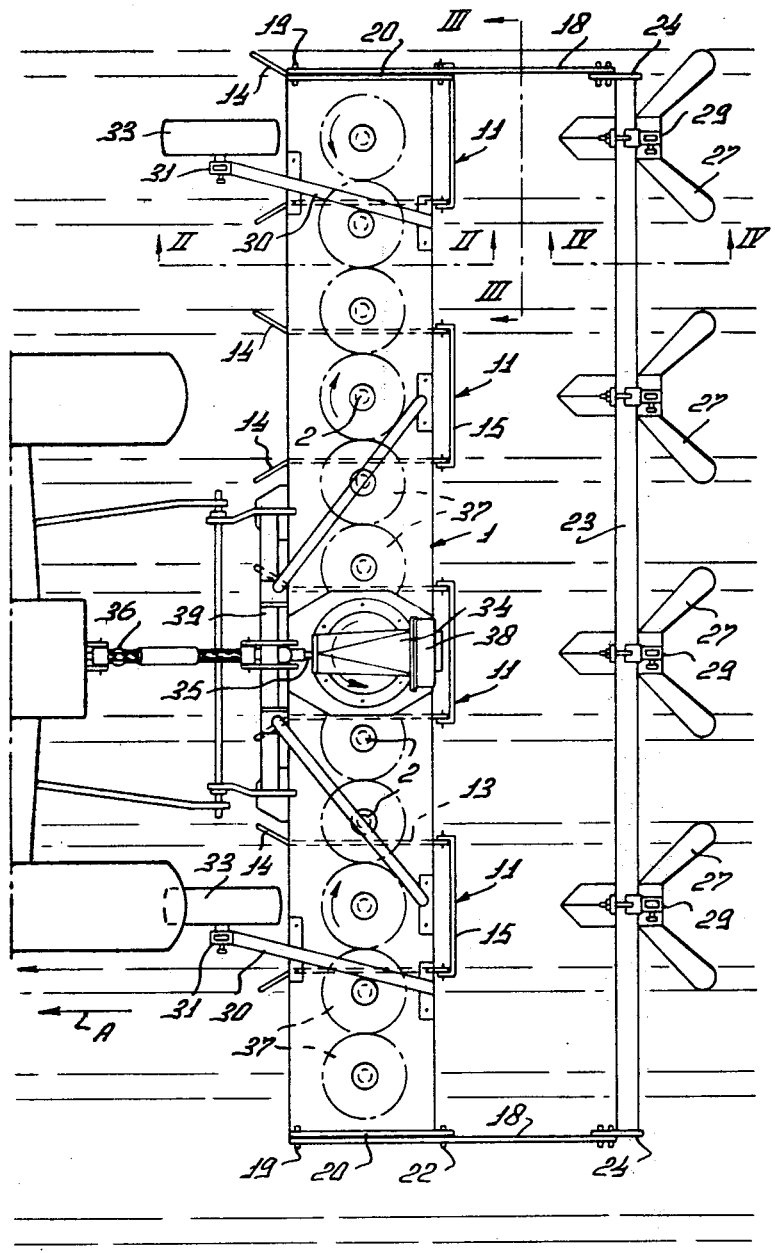

United States Patent [19]

van der Lely et al.

[11] 4,046,202
[45] Sept. 6, 1977

[54] CULTIVATORS

[75] Inventors: Ary van der Lely, Maasland; Cornelis Johannes Gerardus Bom, Rozenburg, both of Netherlands

[73] Assignee: C. van der Lely N. V., Maasland, Netherlands

[21] Appl. No.: 617,419

[22] Filed: Sept. 29, 1975

Related U.S. Application Data

[63] Continuation of Ser. No. 473,572, May 28, 1974, abandoned.

[30] Foreign Application Priority Data

May 28, 1973 Netherlands .................. 7307376

[51] Int. Cl.² ............................................ A01B 33/12
[52] U.S. Cl. ................................... 172/72; 172/59;
172/71; 172/78; 172/81; 172/112; 172/509
[58] Field of Search ................. 172/59, 49, 63, 67, 172/71, 78, 81, 111, 112, 135, 199, 200, 508, 509, 513

[56] References Cited

U.S. PATENT DOCUMENTS

| 1,904,138 | 4/1933 | Hasson et al. .................. 172/59 |
| 2,574,237 | 11/1951 | Barrow ........................... 172/112 X |
| 2,582,364 | 1/1952 | Tice ............................... 172/112 X |
| 3,194,193 | 7/1965 | Walters ......................... 172/112 X |
| 3,316,865 | 5/1967 | Williams ....................... 172/72 X |
| 3,347,188 | 10/1967 | Richey .......................... 172/112 X |
| 3,534,817 | 10/1970 | Garis et al. ................... 172/59 X |
| 3,616,862 | 11/1971 | van der Lely ................ 172/59 X |
| 3,667,551 | 6/1972 | van der Lely ................ 172/111 X |

FOREIGN PATENT DOCUMENTS

| 1,362,564 | 4/1964 | France ............................ 172/112 |
| 701,592 | 1/1931 | France ............................ 172/59 |
| 1,045,698 | 12/1958 | Germany ...................... 172/59 |
| 6,805,358 | 10/1969 | Netherlands ................. 172/111 |
| 346,492 | 4/1931 | United Kingdom .......... 172/59 |

*Primary Examiner*—Paul E. Shapiro
*Attorney, Agent, or Firm*—Mason, Mason & Albright

[57] ABSTRACT

A tractor drawn cultivator comprises a frame extending transversely to the direction of movement of the tractor. A plurality of spaced apart vertical axis rotary driven cultivator members comprising downwardly extending tines are supported from the frame. Surrounding each cultivating member and suspended from the frame is a screen having two spaced apart side walls and an interconnecting rear wall. The side walls have forwardly and outwardly diverging front parts with rearwardly and downwardly extending leading edges. At least a portion of the rear wall is vertically adjustable to control the rate of soil release from the screen. A tool bar to the rear of the main frame may support a plurality of ridging bodies, one behind each cultivator member.

17 Claims, 4 Drawing Figures

CULTIVATORS

This is a continuation of application Ser. No. 473,572 filed May 28, 1974, now abandoned.

This invention relates to soil cultivating implements or cultivators, such cultivators being of the kind comprising a row of soil working members or rotors that extends transverse to the intended direction of operative travel of the cultivator with each member or rotor rotatable about a corresponding vertical or substantially vertical axis and each member or rotor haivng, or being capable of being provided with, at least one soil working tine.

According to the invention, there is provided a cultivator of the kind set forth, wherein for each of some of the soil working members or rotors is provided partially surrounding screen which cooperates with a soil working portion of the or each tine of the corresponding member or rotor for working the soil during the operation of the cultivator.

Figure 2:
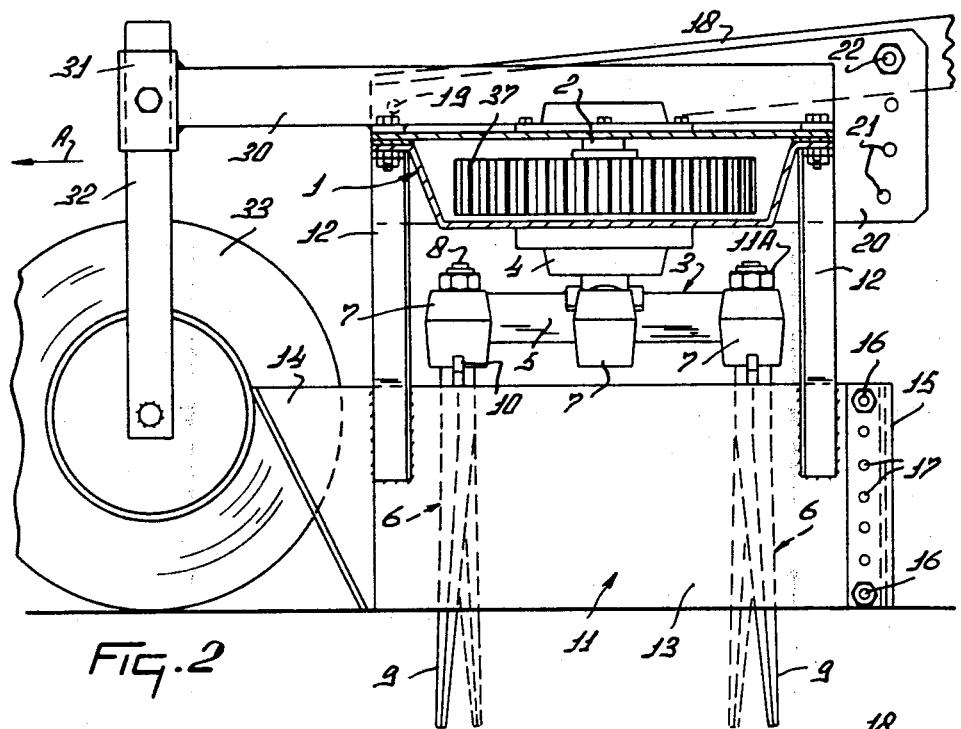
Figure 3:
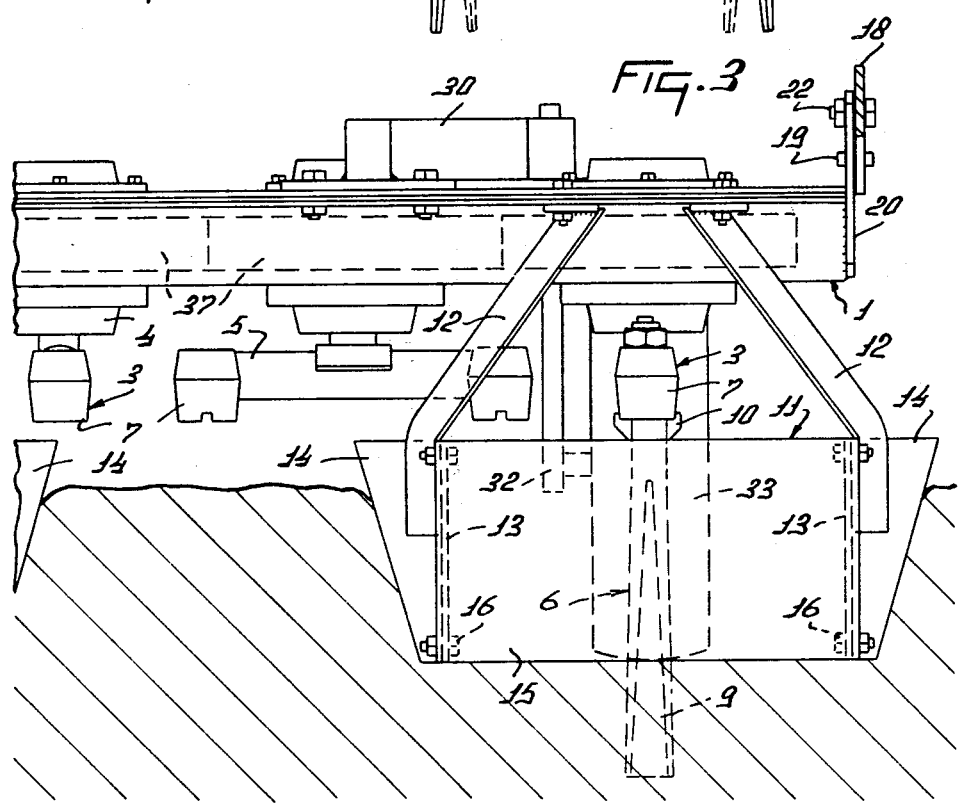
Figure 4:
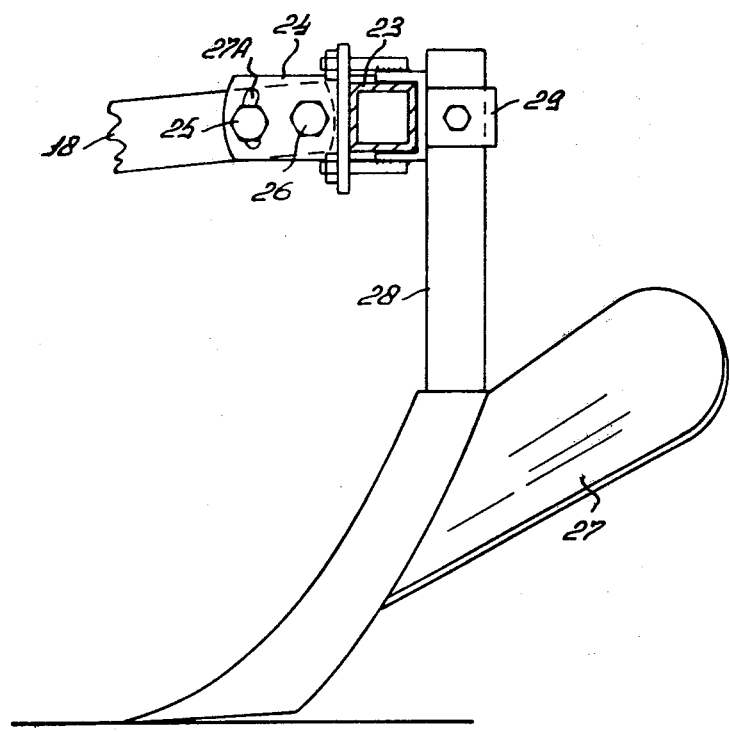

For a better understanding of the invention, and to show how the same may be carried into effect, reference will now be made, by way of example, to the accompanying drawings, in which:

FIG. 1 is a plan view of a soil cultivating implement or cultivator in accordance with the invention connected to the rear of an agricultural tractor, FIG. 2 is a section, to an enlarged scale, taken on the line II—II of FIG. 1, FIG. 3 is a section, to an enlarged scale, taken on the line III—III of FIG. 1, and FIG. 4 is a section, to an enlarged scale, taken on the line IV—IV of FIG. 1.

Referring to the accompanying drawings, the soil cultivating implement or cultivator which is illustrated is in the form of a rotary harrow having a frame which includes a frame portion in the form of a hollow box-shaped beam 1 that extends substantially horizontally transverse, and normally substantially perpendicular, to the intended direction of operative travel of the rotary harrow which is indicated by an arrow A in FIGS. 1 and 2 of the drawings. A plurality, such a 12, of vertical or substantially vertical shafts 2 are rotatably journalled in the hollow beam 1 in lower bearings 4 and aligned upper bearings carried by the top of the frame portion 1. The shafts 2 are arranged in a single row and are spaced apart from one another by equal distances that are preferably substantially 25 centimeters. The lowermost end of each shaft 2 that projects from beneath the corresponding lower bearing 4, that is fastened to the bottom of the hollow beam 1, carries a corresponding soil working member or rotor that is generally indicated by the reference 3.

Each of the soil working members or rotors 3 comprises a substantially horizontally disposed tine support 5 rigidly secured at its midpoint to the lowermost end of the corresponding shaft 2, said support 5 carrying, at its opposite ends, substantially vertically disposed sleeve-like tine holders 7. Each of the tine holders 7 is constructed and arranged to receive the fastening portion 3 of a corresponding rigid soil working tine 6 but, when the rotary harrow is arranged for operation in the manner illustrated in the drawings, only every third one of said members or rotors 3 along the single row thereof is provided with tines 6, the other members or rotors 3 being left without tines. As viewed from behind in the direction A, the extreme right-hand soil working member or rotor 3 has tines 6 so that, with the 12 members or rotors 3 that are provided in the embodiment that is being described by way of example, four of those members or rotors 3 have tines 6 whilst the remaining eight do not.

The fastening portions 8 of the tines 6 are provided, at their uppermost ends, with screw-threaded parts that receive co-operating fastening nuts 11A, said fastening nuts 11A preferably incorporating inserts (not visible in the drawings) arranged to co-operate frictionally with the screw-threads of the fastening portions 8 to prevent vibration during operation from working the nuts loose. The lowermost ends of the nuts 11A are preferably also of frusto-conical configuration to co-operate with matchingly shaped surfaces at the upper internal ends of the tine holders 7 for supporting and centring purposes. The fastening portions 8 carry diametrically opposed lugs 10 near their lower ends and those lugs are arranged for reception in matchingly shaped notches or recesses formed at the lowermost ends of the holders 7 so that, when the tines 6 are secured in their operative positions, they cannot turn about the axes of their fastening portions 8 in the holders 7. The lowermost ends of the fastening portions 8 merge integrally into active or soil working portions 9 of the tines 6, said active or soil working portions 9 making integral junctions with the fastening portions 8 but said junctions being of an angular formation which is such that the longitudinal axes of the two straight portions 8 and 9 are inclined to one another, at the corresponding junction, by an angle of substantially 8°. The length of each active or soil working portion 9 conveniently has a magnitude of substantially 32 centimetres and it will be seen from a comparison of FIGS. 2 and 3 of the drawings that each such porton 9 is progressively flattened towards its lowermost free end or tip in such a way that the flat surfaces which are formed at opposite sides of each portion 9 (one such surface being visible in elevation in FIG. 3 of the drawings) both extend substantially tangentially with respect to circles centred upon the axis of rotation of the corresponding member or rotor 3. As will be evident from FIG. 2 of the drawings, the flat surfaces which have just been mentioned converge in a direction towards the lowermost free end or tip of each active or soil working portion 9.

Each of the four working members or rotors 3 that has tines 6 is partially surrounded by a corresponding screen 11, each screen 11 being rigidly, but releasably, secured to the overlying hollow beam 1 by a pair of supports 12. The lower ends of the supports 12 are fastened to corresponding vertically or substantially vertically disposed side parts 13 of each screen 11, said side parts 13 extending substantially parallel to the direction A. The leading end of each side part 13 with respect to the direction A terminates in a corresponding inclined portion 14. It will be seen from FIG. 1 of the drawings that the two inclined portions 14 that correspond to each screen 11 have their substantially vertically disposed general planes oppositely inclined to the direction A so as to converge rearwardly with reference to that direction and from FIGS. 2 and 3 of the drawings that each portion 14 is of generally triangular configuration with the leading edge thereof (again with reference to the direction A) inclined rearwardly from top to bottom. The rearmost ends of the two side parts 13 of each screen 11 are interconnected by a corresponding rear part 15 that is substantially vertically disposed so as to lie transverse, and normally substantially perpendicular, to the direction A. The rear parts 15 have bent-over rims which are formed with a row of vertically spaced apart holes 17 arranged for alignment with similarlrly disposed holes at the rearmost ends of the side parts 13, small horizontal bolts 16 being provided for entry through selected registering holes to secure the rear parts 15 in corresponding height settings relative to the side parts 13. Each of the side parts 13 and rear part 15 preferably has a vertical extent of substantially 18.5 centimeters, it being noted that this dimension is equal to substantially two-thirds of the preferred length of one of the active or soil working tine portions 9. Each side part 13 has a length in the direction A of substantially 43 centimeters and the perpendicular distance between the two parallel side parts 13 of each screen 11 is preferably not less than substantially 30 centimeters.

Each of the opposite lateral sides or ends of the hollow beam 1 in closed by a corresponding substantially vertically disposed sector plate 20 that extends substantially parallel to the direction A. Substantially horizontally aligned pivots 19 that are disposed at the top and front of the beam 1 and sector plates 20 with respect to the direction A define a common axis that is substantially perpendicular to said direction and arms 18 are turnable upwardly and downwarldy about that axis alongside the two sector plates 20. Each plate 20 is formed near its rearmost edge with respect to the direction A with a row of holes 21 that are all equidistant from the common substantially horizontal axis defined by the pivots 19. The arms 18 are formed with single holes at the same distance from the axis which has just been mentioned and horizontal locking bolts 22 or other locking members are provided for entry through the single holes in the arms 18 and through chosen holes 21 to retain the arms 18 in corresponding angular settings about the axis defined by the pivots 19. A support beams 23 that preferably, as illustrated in FIG. 4 of the drawings, is of hollow formation and square cross-section, extends between the rearmost ends of the arms 18 in a horizontal direction that is transverse, and normally substantially perpendicular, to the direction A. The opposite ends of the support beam 23 carry short forwardly directed strips 24 which are connected to the rearmost ends of the arms 18 by corresponding pairs of bolts 25 and 26. As can be seen from FIG. 4 of the drawings, the rear bolts 26 are pivot bolts entered through single holes in the arms 18 and strips 24 whereas the leading bolts 25 are locking bolts entered through single holes in the arms 18 but through arcuately curved slots 27A in the strips 24, the centres of curvature of said slots 27A coinciding with the common axis defined by the two pivot bolts 26. It will be evident that the support beam 23 can be retained in a chosen angular setting about the axis defined by the bolts 26 by appropriate adjustment and tightening of the bolts 25 and 26.

The support beam 23 carries a number of ridging bodies 27 that is equal to the number of members or rotors 3 having tines 6 so that, in the embodiment which is being described, there are four of the ridging bodies 27 spaced apart from one another at equal distances along the support beam 23. Holders 29 are adjustably clamped to the support beam 23 and each holder 29 comprises a set bolt by which a corresponding upright support bracket 28 can be maintained in a chosen setting of vertical adjustment relative thereto. The four upright support brackets 28 have the four ridging bodies 27 fixedly secured to their lowermost ends and the arrangement is such that, as can be seen in FIG. 1 of the drawings, each ridging body 27 is located to the rear of the corresponding tine-carrying soil working member or rotor 3 with respect to the direction A in longitudinal alignment with that member or rotor 3 considered in said direction. The ridging members 27 are upwardly and downwardly adjustable with the aid of the support brackets 28 and holders 29 and are angularly tiltable about the axis defined by the bolts 26 employing those bolts and the bolts 25, in the manner described above.

The top of the hollow beam 1 has arms 30 rigidly secured to it in such a way that both arms 30 extend substantially horizontally with their leading ends projecting forwardly in front of the beam 1 with respect to the direction A. It will be noted from FIG. 1 of the drawings that, as seen in plan view, both arms 30 are similarly inclined to the direction A. The leading ends of the arms 30 carry substantially vertically disposed sleevelike holders 31 which are provided with set bolts and which receive upwardly and downwardly displaceable supports 32 whose lowermost ends carry axles around which corresponding ground wheels 33 are rotatable. The arrangment is such that, as can been seen in FIG. 1 of the drawings, the planes of rotation of the two ground wheels 33 are in longitudinal register in the direction A with the outermost two of the four tine-carrying members or rotors 3 and the outermost two of the four tine-carrying members or rotors 3 and the outermost two of the four ridging bodies 27.

One of the centre pair of shafts 2 of the single row thereof has an upward extension into a gear box 34 mounted on top of the hollow beam 1. A rotary input shaft 35 projects forwardly with respect to the direction A from the front of the gear box 34 and is splined or otherwise keyed in such a way as to enable it to be placed in driven connection with the power take-off shaft of an operating agricultural tractor or other vehicle by way of an intermediate telescopic transmission shaft 36, that is of a construction which is known per se, having universal joints at its opposite ends. Each of the 12 shafts 2 is provided, inside the hollow beam 1, with a corresponding straight- or spur-toothed pinion 37 and it will be seen from the drawings that the teeth of each pinion 37 are in mesh with those of its neighbour, or each of its neighbours, in the single row thereof. Shafts and pinions within the gear box 34 transmit rotary drive from the input shaft 35 thereof to the shafts 2 and the transmisson includes a change-speed gear 38 mounted at the rear of the gear box 34. It is not necessary to describe the construction of the change-speed gear 38 in detail but, briefly, it comprises interchangeable and/or exchangeable pinions and will provide a different transmission ratio between the input shaft 35 and that shaft 2 in dependence upon the chosen pinion and/or the chosen arrangement thereof. The result is that different speeds of rotation of the shafts 2 can be attained without changing the input speed of rotation applied to the shaft 35. The front of the hollow beam 1 with respect to the direction A carries a coupling member or trestle 39 of generally triangular configuration that is constructed and arranged to enable the rotary harrow to be connected to the three-point lifting device or hitch at the rear of an operating agricultural tractor or other vehicle in the manner which is illustrated in outline in FIG. 1 of the drawings.

In the use of the rotary harrow that has been described, its coupling member or trestle 39 is connected to the three-point lifting device or hitch at the rear of an agricultural tractor or other operating vehicle and the input shaft 35 of the gear box 34 is placed in driven connection with the power take-off shaft of the same tractor or other vehicle by way of the intermediate telescopic transmission shaft 36. Upon moving the harrow in the direction A over soil that is to be worked, the tines 6 of the members or rotors 3 work soil very intensively within the screens 11. Each shaft 2 rotates in a direction opposite to its neighbour, or each of its neighbours, and the four shafts 2 that correspond to the tine-carrying members or rotors 3 rotate in the direction indicated by arrows in FIG. 1 of the drawings. The speed of rotation thereof is preferably substantially 420 revolutions per minute but, as discussed above, that speed can be increased or decreased by an appropriate adjustment of the change-speed gear 38 when required to deal with varying soil consistencies and operating conditions. The tines 6 project downwardly beneath the screens 11 by substantially 13 centimeters and crumble earth received within the screens 11 very intensively. The flattened sides of the portions 9 of the tines 6 cooperate with the various parts of the screens 11 in producing a very finely divided stock of soil within the screens 11 and this finely divided soil progressively escapes from beneath the rear parts 15 of the screens 11 where it is left in line with the following ridging bodies 27. The ridging bodies 27 form the finely divided soil into ridges or build up any existing ridges with growing plants that there may already be.

The rear parts 15 of the screens 11 can be set at levels relative to the side parts 13 thereof which are appropriate to the nature of the soil being worked and to the operating conditions generally by engaging the bolts 16 in corresponding holes 17. The controlled release of finely divided earth from the screens 11 to the ridging bodies 27 ensures a substantially uninterrupted supply to those ridging members so that they form or augment ridges in a very uniform manner. Clearly, the rate of supply of finely divided soil to the ridging members 27 will be greater when the rear parts 15 of the screens 11 are located at higher levels than is shown in FIGS. 2 and 3 of the drawings in respect of one of them. Supply at greater volume per unit time is important when ridges are being initially formed rather than when an operation is being undertaken to augment already existing ridges. When work is being carried out between the existing ridges in which plants such, purely for example, as potatoes, are growing, then it is preferred that the tines 6 should be placed in the positions indicated by broken lines for the lowermost ends of their active or soil working portions 9 as shown in FIG. 2 of the drawings. This is achieved merely by loosening the nuts 11A, turning the fastening portions 8 through 180° in the holders 7 to interchange the lugs 10 and their co-operating notches or recesses and finally retightening the nuts 11A. The active or soil working portions 9 of the tines 6 then converge, rather than diverge, in a downward direction so that the working width of each tine-carrying member or rotor 3 is reduced and the danger of damage to potatoes or other sub-surface crops growing in the existing ridges is minimised. As previously mentioned, the straight active or soil working portions 9 of the tines 6 preferably have length of substantially 32 centimeters and it is preferred that they should not be less than 30 centimeters in length.

The supports 12 and arms 30 are readily detachable from the hollow beam 1 and the support beam 23 carrying the ridging bodies 27 can readily be replaced by a ground roller or other supporting member. Upon taking these steps and providing the empty tine holders 7 with soil working tines, the rotary harrow can quite quickly and easily be brought to a condition in which it can be employed for the formation of a seed bed without performing any ridge construction.

Although various features of the soil cultivating implement or cultivator that has been described and/or that is illustrated in the accompanying drawings will be set forth in the following claims as inventive features, it is emphasised that the invention is not necessarily limited to those features and that it includes within its scope each of the parts of the soil cultivating implement or cultivator that has been described and/or that is illustrated in the accompanying drawings both individually and in various combinations.

What we claim is:

1. A cultivator comprising a frame and a plurality of power driven soil-working members rotatably mounted on corresponding upwardly extending axes supported on said frame, said axes being positioned in a row that extends transverse to the direction of travel and at least one of said soil-working members including downwardly extending soil-working means, a screen supported on said frame and said screen having side and rear parts that extend upwardly around the sides and the rear of said one soil-working member, said side parts being substantially vertical and extending generally parallel to the normal direction of travel, the leading ends of said side parts having outwardly and forwardly divergent portions, the leading edge of each divergent portion being inclined downwardly and rearwardly from its uppermost extremity to the lowermost extremity thereof. said screen being located adjacent said soil-working means and cooperating therewith; said screen in combination with the soil-working means producing finely divided soil within the screen during operation, the rear part of said screen having a substantially vertical surface positioned to gradually release finely crumbled soil to the rear of said one soil-working member, said rear part being connected to said side parts and means selectively positioning said screen into the soil together with said soil-working means, whereby the rate of discharge of worked soil beneath said rear part and behind said screen with respect to the direction of travel, is controlled.

2. A cultivator as claimed in claim 1, wherein said screen partly surrounds said soil-working member and is open at the top, the corresponding shaft of said soil-working member extending upwardly through the opening at said top.

3. A cultivator as claimed in claim 2, wherein said screen is substantially rectangular in configuration as seen in plan view.

4. A cultivator as claimed in claim 1, wherein said rear part has means for adjusting that part upwardly and downwardly in height relative to said side parts.

5. A cultivator as claimed in claim 4, wherein at least one part of said screen has a height which is substantially two-thirds of the length of the soil-working portion of a tine of said soil-working means.

6. A cultivator as claimed in claim 4, wherein said rear part and said side parts are substantially equal in height.

7. A cultivator as claimed in claim 1, wherein said screen is connected to said frame by support means.

8. A cultivator as claimed in claim 7 wherein said support means includes two supports located adjacent the front and rear of the side parts of said screen.

9. A cultivator as claimed in claim 1, wherein said soil-working means comprises a pair of tines each of which has a fastening portion connected to a soil-working portion, the two tine portions of said pair being inclined to one another, said soil-working portion being flattened on a least one side thereof towards its tip.

10. A cultivator as claimed in claim 9, wherein both sides of the soil-working portion are flattened.

11. A cultivator as claimed in claim 10, wherein the flat surfaces of the flat sides extend throughout substantially the whole of the length of that portion.

12. A cultivator as claimed in claim 11, wherein each flattened side extends substantially tangentially with respect to a circle centered upon the corresponding axis of rotation of the soil-working member.

13. A cultivator as claimed in claim 10, wherein the two flattened sides converge towards the tip of said soil-working portion.

14. A cultivator as claimed in claim 1, wherein each soil-working member has two tines which are mounted with their soil-working portions extending in opposite directions, each tine being turnable through 180° around its longitudinal axis to change the distance between the soil-working portions of said two tines.

15. A cultivator as claimed in claim 1, wherein said soil-working members are journalled in a hollow frame portion of that frame that extends transverse to the normal direction of travel, said screen also being connected to depend from said frame portion.

16. A cultivator as claimed in claim 15, wherein an elongated support is connected at the rear of said frame portion, said support carrying a ridging body that is positioned at the rear of said screen.

17. A cultivator as claimed in claim 16, wherein the front of said frame portion is connected to at least one ground wheel which is located in front of said screen.

* * * * *